May 22, 1934.   W. G. McMURRAY   1,959,440
HIGH PRESSURE SEPARATOR
Filed July 28, 1932   2 Sheets-Sheet 1
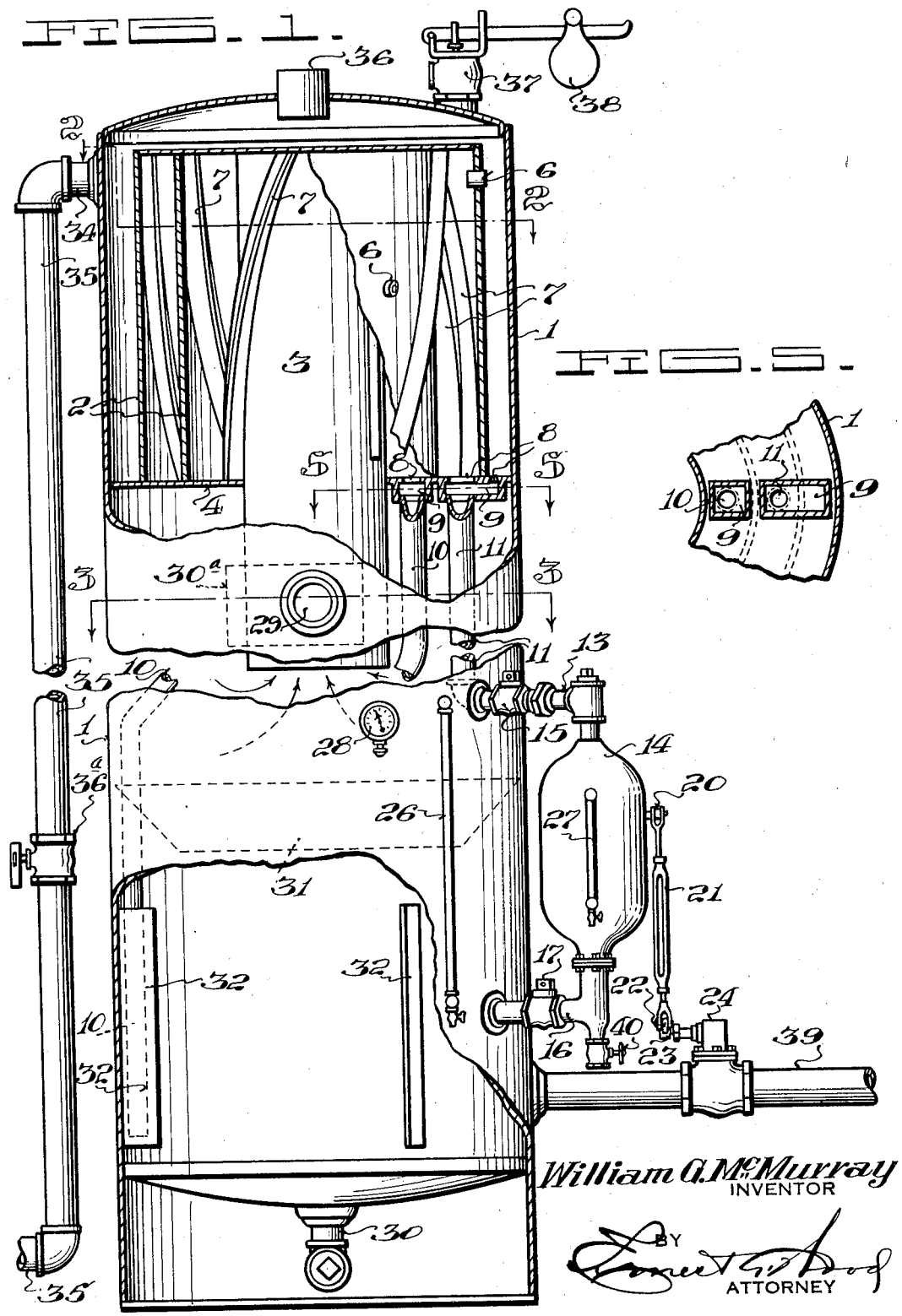

May 22, 1934.  W. G. McMURRAY  1,959,440
HIGH PRESSURE SEPARATOR
Filed July 28, 1932  2 Sheets-Sheet 2
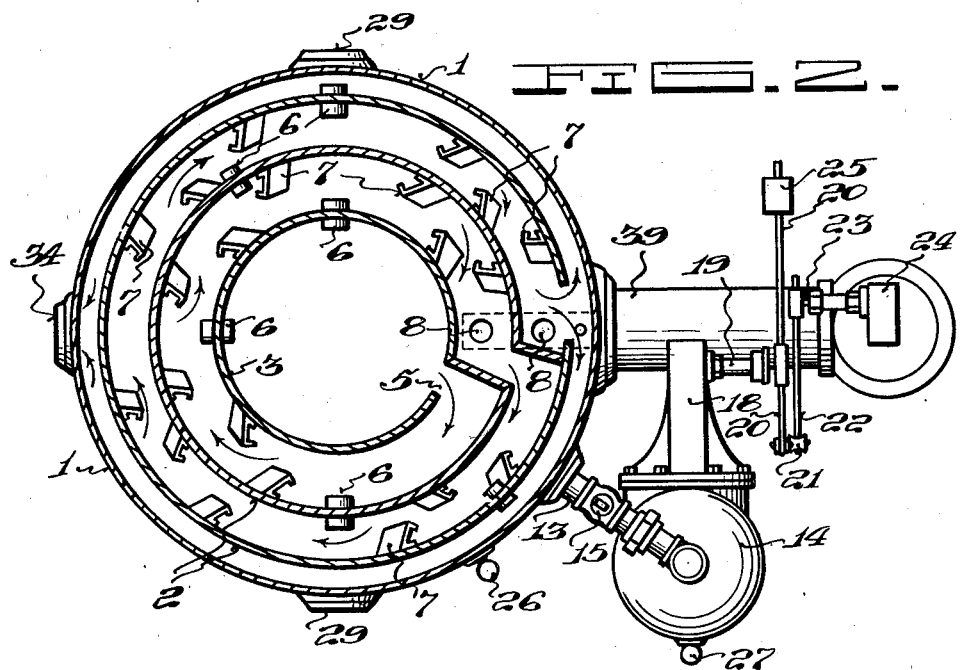
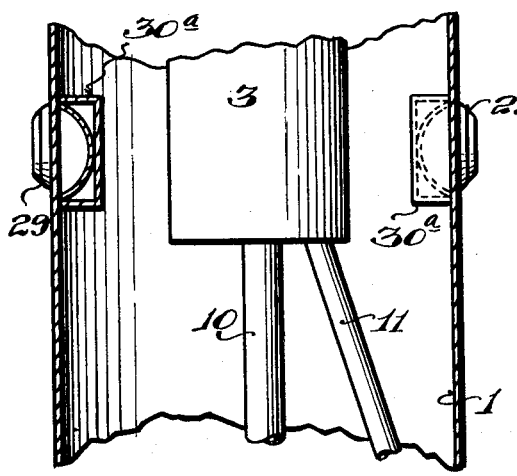
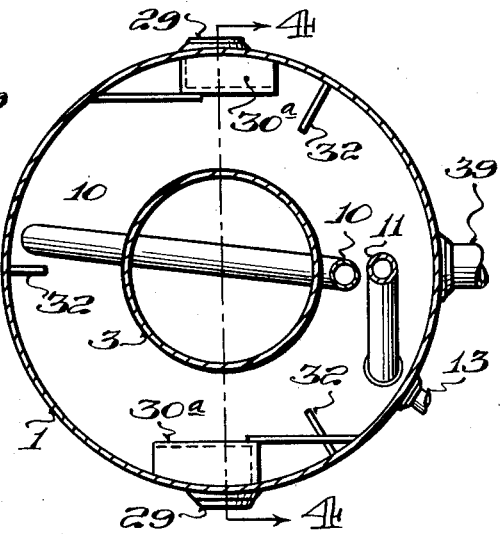
William G. McMurray
INVENTOR
ATTORNEY Patented May 22, 1934

1,959,440

UNITED STATES PATENT OFFICE 1,959,440

HIGH PRESSURE SEPARATOR

William G. McMurray, Wichita Falls, Tex., assignor to M & V Tank Company, Wichita Falls, Tex.

Application July 28, 1932, Serial No. 625,357

3 Claims. (Cl. 183—2.7)

This invention relates to separator tanks and it has particular reference to a separator tank and method of separating oil, and gas as the product of a producing oil well.

The principal object of the invention is to provide a separator tank and method for separating the fluids entering the tank in accordance with their natural flow, allowing the gas content to rise and during which, the lighter volatiles entrained with the gas are extracted and caused to be again associated with the liquid content.

Another and important object of the invention is to insure maximum results in separating the entrained gas from the vapors by increasing the area against which gaseous vapors contact through the medium of a multiplicity of concentric chambers containing a plurality of spirally disposed fins. These fins or baffles are effective in agitating the vaporous gases mildly during their ascent so that the entrained liquid particles may be better intercepted and allowed to drain back into the tank.

Still another object of the invention is to provide for the equalization of gas pressure in the several chambers through which the gases are passed and relieved of their vaporous content. By equalizing the pressure in the chambers, a turbulent condition is overcome which would otherwise exist if the pressure in one chamber was in excess of that in an adjacent chamber. It is also apparent that in equalizing the pressure in the upper gas chambers, such pressure is also equalled with the pressure on the crude oil from which the gas is separated and prevents the crude from being forced out of the tank by such pressure before proper treatment of the vaporous gases is accomplished.

The invention further contemplates the several novel steps in the method of gas and oil separation which consists in introducing the fluids into a confined area to allow for the ascension of the gases in imparting to the ascending gases a swirling motion and in baffling the fluids during such motion to expel the vapors entrained with the gas for condensation and finally in returning the entrained liquid to the body of oil.

Yet another object of the invention is to provide means for drawing off the separated constituents and disposing of them at different points. The oil level in the tank is maintained at a predetermined point by a suitable level control situated exteriorly of the tank and through the medium of this control a valve is opened to allow oil to pass out of the tank and is automatic in its function.

With the foregoing objects as paramount, the invention has particular reference to its salient features of construction and arrangement of parts, which will become manifest as the description proceeds, taken in connection with the accompanying drawings, wherein:—

Figure 1 is an elevational view of a separator tank constructed according to the present invention with portions broken away to illustrate the interior thereof.

Figure 2 is a transverse section on lines 2—2 on Figure 1.

Figure 3 is a transverse section on lines 3—3 on Figure 1 in slightly reduced size.

Figure 4 is a fragmentary section above the middle of the tank shown in Figure 1, and Figure 5 is a fragmentary detail view on lines 5—5 on Figure 1.

Continuing with a more detailed explanation of the drawings, 1 designates the body of the tank proper in the upper portion of which are a plurality of concentrically arranged chambers defined by the circular partitions 2 and within the innermost chamber there is provided a flue 3, which extends well below the plate 4, constituting the common bottom for all of the concentric chambers. This flue 3 is adapted to receive the ascending gases so that they may be distributed equally throughout the several concentric chambers as well as within the tank proper.

It will be noted that the flue 3 has an opening 5 therein above the plate 4, as shown in Figures 1 and 2. This opening allows the ascending gases to escape into the chamber surrounding the flue 3. In addition, the flue is provided with a series of communicating ports 6, as is likewise the surrounding chamber.

In each of the chambers, there is provided a series of fins or baffles 7. These baffles are in the form of strips which are connected to and extend around the walls of the several concentrically arranged chambers. The purpose of which is to provide maximum contact surface for the vapor laden gases, which, combined with a spiral swirling action thereby imparted is a desideratum for proper separation of the entrained moisture from the gas.

The gas, laden with globules of oil or in which liquid particles are entrained is required to contact the baffles which latter will be effective in causing the gas to move upward in a circular or spiral fashion, thus insuring maximum contact of the gas with the baffles and walls of the chambers. Separation will take place and the entrained liquid particles will return to liquid form and will pass through the openings 8 into the receptacles 9, shown in detail in Figure 5, after which the entrapped oil will flow downwardly through pipes 10 and 11. The oil flowing downwardly through pipe 10 passes from one side of the tank to the opposite side, as shown in Figures 1 and 3 and enters the tank proper near the bottom behind the vertical baffle 32, as shown in Figure 1. The oil flowing downwardly through pipe 11 passes outwardly through the side of the tank, through the lateral pipe 13 thence into the float control 14. The pipe 13 is provided with a normally open valve 15. The float control 14 is the conventional type of liquid level control and it is not considered necessary herein to illustrate or describe the mechanism contained within the float housing shown other than to say that the housing contains a float which is rendered active by the ingress of liquid through the pipes "11 and 13" at the top of the control 14 and the liquid passing through pipe 16 into the bottom of the control from the tank 1. There is another normally open valve 17 in the pipe 16 allowing the liquid to flow into the bottom of the control 14. The float carries an arm, not shown, which extends into the casting 18, which is shown only in Figure 2 to rotate the shaft 19 which extends from the casting 18 and to the opposite end of which is pivotally connected a weighted arm 20.

One end of the arm 20 has connected thereto a turnbuckle 21 and the lower end of the latter is connected to an arm 22, which in turn is joined to the extended end of a stub shaft 23 entering a valve housing 24. By moving the weight 25 lengthwise of the arm 20, adjustments may be made to control the movements of the float within the liquid level control 14, which is necessary in view of the fact that the fluids entering the separator tank are usually crude oil and entrained gases and the float must be so adjusted as to become operative at predetermined time to maintain a predetermined liquid level within the tank 1 at all times. The tank 1 is provided with a visible indicator 26 and the control 14 is provided with a similar indicator 27 in order that the liquid level may be constantly determined. The tank 1 is also equipped with a pressure indicator 28. Further reference to the liquid level control 14 will be given in the course of the following description.

Oil with attendant gases is introduced into the tank 1 through the inlets 29 on either side of the tank immediately above the lower end of the gas flue 3 and as the fluid is introduced, it seeks the lowermost point in the tank 1, for which there is a drain 30 at the bottom of the tank and due to the baffles 30a, embracing the inlets 29, the fluid from both streams is directed around the walls of the tank to avoid interference of one stream with the other. A beveled flange 31 directs the fluid downwardly and this flange, together with the perpendicular baffles 32, which latter are spaced about the lower portion of the tank further minimizes agitation of the fluids which may act as a hindrance to proper separation of the fluids.

The tank may be provided with suitable steam coil connections if heat is necessary, and steam coils of a conventional design may be mounted in the tank 1 near the bottom thereof through which steam may be circulated for the desired results.

As stated, the oil will seek its level in the tank and the attendant gases will enter the flue 3 in the manner shown by dotted lines in Figure 1 and in passing upwardly, the gas will enter the several concentrically arranged chambers through the passageways shown in Figure 2 and out of the tank through the outlet 34 and pipe 35 to a point of disposal well removed from the separator tank. In addition to the outlet 34, an auxiliary gas outlet 36 is provided in the dome of the tank 1 and should the pressure within the tank become excessive, a back pressure or regulator valve 36a is provided in the gas outlet pipe 35 and is set to open upon the accumulation of a predetermined gas pressure. This valve may also be of conventional design. A safety valve 37 is provided upon the dome of the tank and which has an adjustable weight 38 in attendance thereto which will allow escape of gases in emergency cases.

As stated previously, the liquids entering the tank seek their level in accordance with their natural flow and the control 14 remains inoperative until a predetermined level is reached by the oil, at which time the oil flows into the pipe 16, into the regulator 14 and upon equalizing with the drainage from the gas trap through the pipes 11 and 13, the float in the control 14 is actuated to rotate the shaft 19, shown in Figure 2. The valve 24 is hereby opened to allow the oil to escape through the pipe 39 to a suitable storage tank or other source.

In the meantime, the attendant gases ascend and are entrapped in the flue 3 and fill the several concentric chambers surrounding the trap and in due course, the gases escape through outlets 34, 36 and 37 in substantially dry form, due to the fact that the manner of baffling, previously described herein has been found to be effective in relieving the gases of practically all of the entrained vapors. This is done during the swirling motion of the gaseous substances following the least course of resistance for escape, and the heavier particles being thrown against the baffle plates 7 allows the latter to drain back into the tank 1 and into the control 14, which is provided with a drain cock 40.

Manifestly, the construction shown is capable of considerable modification and the steps in the method described may be varied and such modification and variation as is considered within the scope and meaning of the appended claims is also considered within the spirit and intent of the invention.

What is claimed is:

1. A high pressure fluid separator tank having a portion divided by a series of concentrically arranged partitions to define communicating chambers, a plurality of spirally disposed baffle plates affixed to said partitions in spaced, staggered relationship to impart a swirling motion to the gas passing through said chambers to effect removal of liquid particles entrained with said gas prior to the discharge of the latter from said chambers and means operative to predetermine the liquid level in said tank.

2. A high pressure fluid separator tank having fluid inlets and separate fluid outlets, a gas trap comprising concentrically disposed partitions defining separate chambers for the reception of the gaseous constituent of the contents of said tank, a centrally disposed flue for directing said gaseous constituent into said chambers, means for equalizing the pressure in said chambers and tank, a series of baffle plates spirally arranged on said partitions and extending in staggered relationship into the spaces between said partitions for baffling said gas during its passage through said chambers to effect removal of liquid particles entrained with said gas, means for withdrawing the liquid particles from said chambers and means operated by the liquid content of said tank for maintaining a predetermined liquid level therein.

3. A fluid separator tank having fluid inlets and outlets, means for automatically controlling the level of the liquid content of said tank, a series of partitions defining concentric chambers in said tank for receiving ascending gases, a flue for directing said gases into said chambers, a series of spirally disposed baffle plates affixed to said partitions for imparting a swirling motion to said gases to effect separation of the entrained liquid particles therefrom prior to their discharge from said tank and means for returning the liquefied particles to said tank in separate streams from said chambers.

WILLIAM G. McMURRAY.